March 1, 1960  W. A. BYCHINSKY  2,927,144
SPARK PLUG-ENGINE SEAL CONSTRUCTION
Filed April 6, 1956
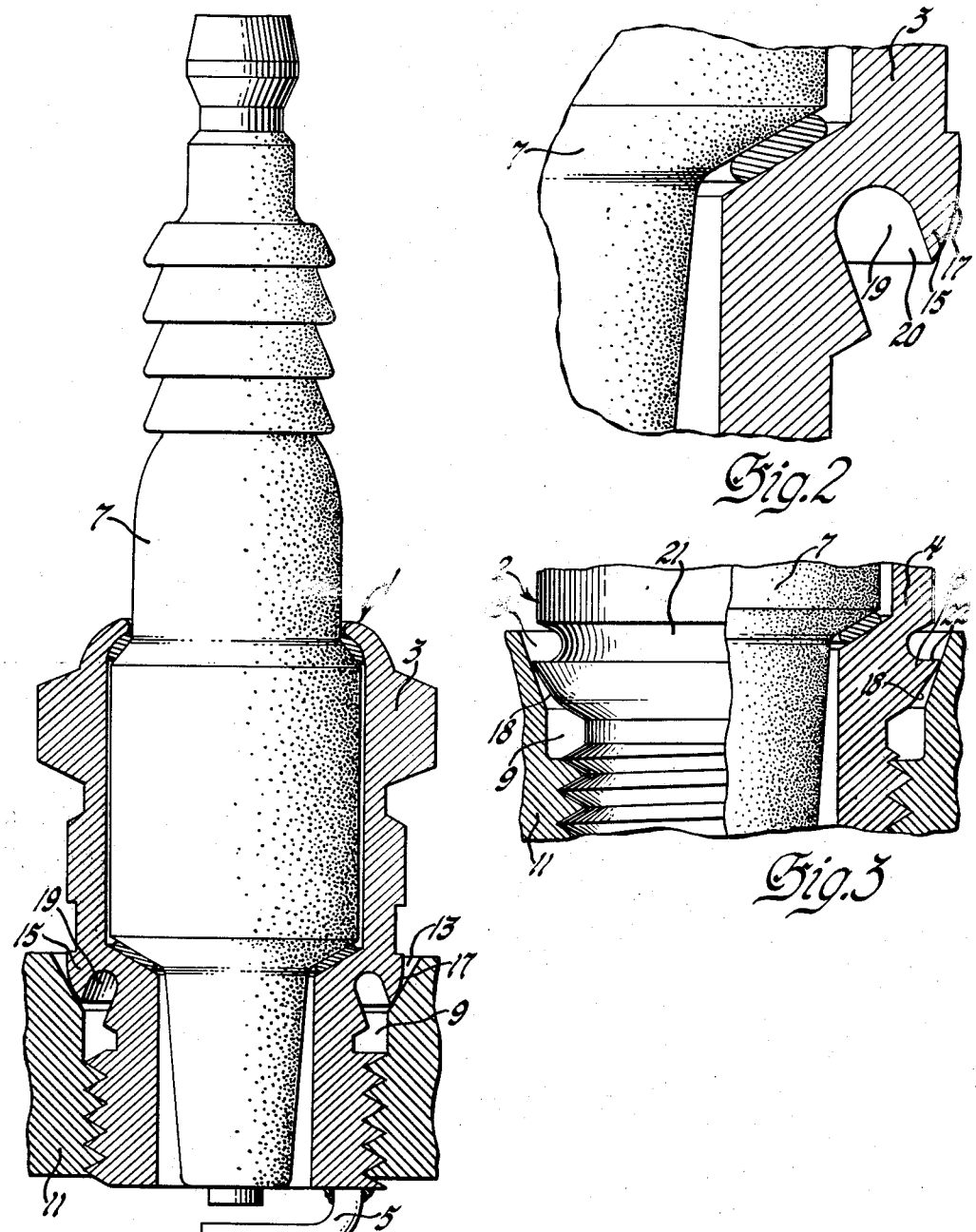
INVENTOR
Wilfred A. Bychinsky
BY
S. E. Ross
ATTORNEY

United States Patent Office 2,927,144
Patented Mar. 1, 1960

2,927,144

SPARK PLUG-ENGINE SEAL CONSTRUCTION

Wilfred A. Bychinsky, Ann Arbor, Mich., assignor to General Motors Corporation, Detroit, Mich., a corporation of Delaware Application April 6, 1956, Serial No. 576,607

10 Claims. (Cl. 123—169)

This invention relates to a spark plug-engine seal construction and more particularly to a construction wherein the spark plug has integrally formed therewith a seating portion adapted for cooperation with a tapered seating surface formed in the engine cylinder head.

One of the problems presented in internal combustion engine ignition practice is that of assuring maximum power output from the engine by precluding leakage of combustion gases from the interconnection between the spark plug and the engine cylinder head. While it was recognized that such leakage might be substantially eliminated by the use of sufficient torque in threading the plug into the engine and/or by use of a tapered thread on the lower end of the plug shell, such expedients were not preferred since the spark plug is not adapted to withstand high torquing forces and since the use of tapered threads is both expensive and susceptible to rapid wear.

It became common practice in the art to use a soft metal washer between the seating surface machine in the engine cylinder head at right angles to the axis of the plug receiving bore and the sealing surface provided on the plug shell at right angles to the axis of the plug. By use of the soft metal sealing washer, a gas-tight seal was achieved between the plug and the engine without the necessity of using unduly high torque forces in installing the plug. Similarly, it was found that the soft metal washer prevented seizing between the plug and the engine under the effects of continued expansion and contraction of the metal parts under normal operating conditions.

Recently, in the interest of obtaining a better seal and eliminating the use of the metal washer for economy and reduction of costs, engine cylinder heads have been provided with a conical seating surface about the plug bore for cooperation with a spark plug having a correspondingly shaped sealing portion of relatively large surface area and an identical taper provided on the shell. It has been found, however, that such construction tended to permit the leakage of gas from the plug bore unless extremely high torque forces were used. Where such high torque forces were employed, it was discovered that the sealing surfaces rapidly became worn thus destroying any sealing action and that the sealing surfaces would tend to seize under the effects of repeated relative expansion and contraction between the spark plug shell and the cylinder head with the result that removal became a problem and the spark plug body was frequently sheared in two in attempts to remove the plug from the engine bore.

It is therefore an object of my invention to provide a spark plug having an engine sealing portion formed as an integral part of the shell and adapted for use with a conical engine seating surface. It is a further object of my invention to provide a spark plug having a resilient seating portion formed on the shell and having a tapered sealing surface adapted to provide a substantially minimum area of contact with the engine seating surface. It is a further object of my invention to provide a sealing construction between an engine having a conical seating surface and a spark plug having an integrally formed seating portion on the shell in which the seating portion is adapted to function as a spring-like sealing member having a tapered sealing surface capable of being loaded upon contact with the engine seating surface. It is another object of my invention to provide a sealing construction between a spark plug and an engine having a conical seat wherein the plug sealing surface and engine seating surface are in direct contact with each other and wherein the plug seating portion is elastically deflected by the engine seating surface.

These and other objects of my invention may be achieved by forming the seating portion of the plug as a cantilever spring-like member which is elastically deflected by the cylinder head seating surface when installed in the engine, the seating surface being contacted by the end section of the seating portion upon installation.

The detailed construction and operation of my invention may be readily understood from the description and the drawing related thereto in which Figure 1 shows a partial sectional view of one embodiment of my invention as installed in an engine having a conical seating surface; Figure 2 is an enlarged sectional view of the seating portion of the plug shown in Figure 1; Figure 3 shows a preferred embodiment of my invention in partial section with parts broken away.

In Figure 1 there is shown a spark plug 1 comprising a shell 3 having a ground electrode 5 positioned at the lower end thereof in the conventional manner. Positioned concentrically within the shell 3 in the usual manner is an insulator-center electrode subassembly 7, the subassembly being likewise formed in a manner well known in the art and forming no part of my invention. The spark plug 1 is shown as being threadedly assembled within a bore 9 provided in the cylinder head of the engine 11.

As is clearly shown in Figure 1, the plug receiving bore 9 of the engine 11 is surrounded by a conical seating surface 13. I have found that a gas-tight non-seizing interconnection between the shell 3 and the seating surface 13 may be achieved without the use of soft metal washers by forming a seating portion 15 on the shell wall adjacent the threaded end of the shell and adapted to act as a spring-like member in the manner more particularly described hereinafter.

As is more clearly shown in Figure 2, the annular seating portion 15 formed on the shell 3 is provided with a tapered sealing surface 17, specifically shown as a curved surface extending generally upwardly and outwardly, which results in a substantially minimum area of surface contact between the portion 15 and the engine seating surface 13. By providing a groove 19 adjacent the seating portion 15, the seating portion is formed with a relatively narrow cross-sectional area at its outer end and is therefore adapted to be elastically deflected and act as a cantilever spring-like member when subjected at its end section to any force by the seating surface 13, as upon threading the plug 1 into the engine bore 9. Though the groove 19 may be formed above or below the seating portion 15, in the embodiment shown in Figures 1 and 2 the groove is positioned below the seating portion, its angle being such as to form an acute angle between the groove wall 20 and the tangent to the curved sealing surface 17 at the outer end thereof. It is thus apparent that, as desired, upon threading the spark plug 1 into the threaded bore 9 of the engine, the outer end of the cantilever spring-like seating portion 15 having the tapered, curved, sealing surface 17 will be brought into substantially line contact with the conical surface 13 surrounding the bore 9. The application of a predetermined small amount of torque to the shell 3 will result in the seating portion 15 being elastically deflected inwardly with the result that a resilient seal over but a very narrow band of surface area is achieved between the seating surface 13 and the sealing surface 17. In this manner, a gas-tight seal is assured between the engine and the plug despite relative expansion therebetween under the high operating temperatures encountered. Similarly, the plug 1 is readily removed from the engine 11 by the application of but a small amount of torque since the contact area between the sealing surface 17 and the seating surface 13 is maintained at a substantial minimum. Likewise, a gas-tight seal is achieved with a minimum amount of torque by reason of the small area of surface contact.

The same sealing action as was described with respect to Figures 1 and 2 is achieved in the preferred embodiment of my invention shown in Figure 3. As is shown in Figure 3, the spark plug 2 is threaded within the bore 9 of the engine 11, a conical seating surface 13 being provided about the bore 9. The cantilever seating portion 16 of the shell 4 is likewise provided with a tapered sealing surface 18. However, as is clearly shown, the surface 18 is conical instead of being curved, for ease in manufacturing. Likewise, it should be noted that the cantilever spring-like action of the portion 16 is achieved by providing a radial groove 21 above the seating portion. The use of a radial groove is preferred for reasons of simplicity of tooling though the groove 21 may also be positioned obliquely in the shell 3, it being merely necessary to form an acute angle between the wall 22 of the groove and the sealing surface 18 for obtaining a relatively narrow cross-sectional area at the outer end of seating portion 16. It should be noted that the angle between the sealing surface 18 and the seating surface 13 is also acute for optimum cantilever action. As in the embodiment of Figures 1 and 2, upon installation, the initial contact between the conical sealing surface 18 and the conical seating surface 13 will be substantially line contact at the end of seating surface 16. Complete installation of the plug 1 in the engine 11 will resiliently deflect the seating portion 16 inwardly with the result that a resilient seal over but a very narrow band of surface area is achieved with the application of but small torque, i.e., 5–20 lb. ft. By reason of the small area of contact, the plug 1 is readily removed from the engine. While the foregoing is a description of my preferred construction, the groove 21 may be formed in the shell at an angle instead of radially and may be placed below the seating portion.

As used herein and in the claims, the term tapered surface is intended to mean either a conical or a curved surface extending generally upwardly and outwardly from the spark plug shell.

It will be apparent from the foregoing description that I have provided a spark plug seating construction which is both simple and inexpensive while at the same time being readily adapted to form a gas-tight non-seizing or readily removable interconnection with the conical seating surface of the engine in which it is positioned. While other embodiments of my invention will be apparent to those skilled in the art, it is to be understood that such other embodiments are within the intended scope of my invention as set forth in the claims which follow.

What is claimed is:

1. In a spark plug having a metal shell adapted to be threadedly interconnected with an engine of the conical seating surface type, the improvement comprising an annular resilient spring-like seating portion formed as an integral part of said shell with a cross-sectional area which decreases from the base on the shell to a relatively narrow section at the tip and having a tapered sealing surface which is non-parallel with respect to the engine seating surface, said seating portion being tapered and thus adapted for elastic deflection by the conical seating surface of the engine to form a non-binding gas-tight interconnection without being stressed to the elastic limit.

2. In a spark plug having a shell adapted for threaded interconnection with an engine having a conical seating surface for cooperation with said spark plug to form a non-seizing temperature compensating gas-tight seal therewith, the improvement comprising an annular tapered seating portion formed on and as an integral part of said shell and having a tapered sealing surface which is non-parallel with respect to the engine seating surface, and an annular groove in said shell adjacent said seating portion, the side wall of said groove forming a surface of said tapered seating portion, said seating portion having a cross-sectional area which decreases from the base on the shell to a relatively narrow section at the tip to enable said seating portion to cooperate with the engine seating surface as a cantilever spring-like member.

3. The device as set forth in claim 2 wherein the groove is radial and is positioned above said seating portion.

4. The device as set forth in claim 2 wherein the groove is positioned below said seating portion.

5. The device as set forth in claim 3 wherein said tapered sealing surface is conical and the angle between the sealing surface and the wall of the groove is an acute angle.

6. The device as set forth in claim 3 wherein said tapered sealing surface is curved and the angle between the tangent to the curved sealing surface at the outer end thereof and the wall of the groove is an acute angle.

7. In combination, an engine having a conical spark plug seating surface, a spark plug positioned on said engine, said spark plug comprising a metal shell and an insulator and center electrode subassembly positioned within said shell, a resilient tapered spring-like seating portion formed as an integral part of the spark plug shell and having a tapered sealing surface, only the narrow end section of said resilient seating portion contacting said conical engine seating surface and being loaded by said engine seating surface to form a readily removable interconnection therebetween forming a gas-tight seal against leakage of engine gases.

8. In combination, an engine having a conical spark plug seating surface, a spark plug positioned on said engine in gas-tight relationship therewith and having a metal shell, a tapered annular spring-like seating portion formed on and integral with said shell and having a tapered sealing surface, only the narrow end section of said seating portion being in contact with said conical seating surface, and a groove in said shell adjacent said seating portion, said seating portion having a relatively narrow cross-sectional area at its outer end and being thus elastically deflected by said engine seating surface to form a gas-tight non-seizing and temperature compensating interconnection therebetween by means of a narrow band of contact area.

9. The combination as set forth in claim 8 wherein said tapered sealing surface is curved and the groove is positioned below said seating portion, the wall of the groove forming an acute angle with the tangent to the curved sealing surface at the outer end thereof.

10. The combination as set forth in claim 8 wherein said tapered sealing surface is conical and the groove is positioned above said seating portion, the wall of the groove forming an acute angle with the sealing surface.

References Cited in the file of this patent

UNITED STATES PATENTS

| | | |
|---|---|---|
| 1,778,182 | Bullington | Oct. 14, 1930 |
| 2,209,621 | Carter | July 30, 1940 |
| 2,746,486 | Gratzmuller | May 22, 1956 |

FOREIGN PATENTS

| | | |
|---|---|---|
| 290,012 | Great Britain | May 10, 1928 |
| 809,271 | Germany | July 26, 1951 |